A. DENES.
DOLL HEAD.
APPLICATION FILED SEPT. 11, 1918.

1,309,190. Patented July 8, 1919.

INVENTOR
Alexander Denes

UNITED STATES PATENT OFFICE.

ALEXANDER DENES, OF BROOKLYN, NEW YORK, ASSIGNOR TO THE WAK NOVELTY CO., INC., OF NEW YORK, N. Y.

DOLL-HEAD.

1,309,190.   Specification of Letters Patent.   Patented July 8, 1919.

Application filed September 11, 1918. Serial No. 253,619.

*To all whom it may concern:*

Be it known that I, ALEXANDER DENES, a subject of the King of Hungary, residing at Brooklyn, in the county of Kings and State of New York, have invented new and useful Improvements in Doll-Heads, of which the following is a specification.

This invention relates to dolls, the invention being more particularly related to dolls of the type having movable eye elements.

A principal object of the invention is to provide in a one piece doll head certain features which will permit of the quick and efficient mounting therein of connected eye elements, weighted to open and close automatically, accordingly as the head is elevated or lowered, the arrangement being such that the means for maintaining the eye elements in operative position may be employed as a stop for limiting and defining the movement of the eye elements in one direction.

Another object of the invention is the provision of an eye structure which may be quickly and efficiently mounted without error by unskilled or comparatively unskilled workmen, the parts being so made and arranged that they may be installed and mounted in two operations, accomplished through the neck opening of a one piece head.

With these and other objects in view, the invention resides in the details of construction and in the arrangement and combination of parts hereinafter described, defined in the claims, and illustrated in the accompanying drawings, forming a material part of this specification, and in which:—

Figure 1:
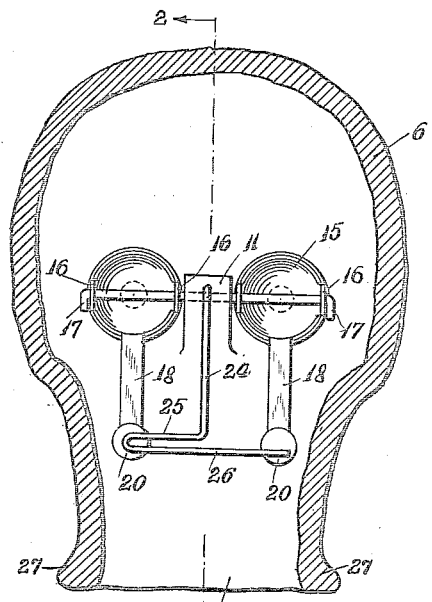
Figure 1 is a sectional view through a one piece head in upright position, taken on the line 1—1 of Fig. 2, this view showing in particular the eye construction in rear elevation.

In the accompanying drawings, the numeral 6 denotes the doll's head, cast or otherwise produced in one piece out of any suitable substance or composition of matter, the same having a neck opening 7, and on either side of the nose 8 the usual eye opening or aperture 9, immediately behind which is an eye-ball socket or recess 10.

Behind the nose 8, and consequently between the sockets 10, there projects inwardly a bracket or bridge member 11, preferably formed integral with the head, but which may be made as a separate member, and then glued or otherwise secured to the head in proper vertical position. Provided in this bracket from the top edge 12 transversely thereof is a slot 13, receptive of a shaft or axis 14, on which is swung the two semi-spherical eye-shells 15, adapted movably to fit one in each socket 10. In order to be swung upon the shaft 14 for the free reciprocating movements desired, the eye-shells 15 are each formed with a pair of alined ears 16 at their polar or axial regions, the said ears being provided, transversely therethrough, with alined openings through which the said shaft extends.

At each end, the shaft 14 is bent at an angle as 17, in order that when the shaft is dropped into the slot 13 with the eye-shells in their sockets, the eye-shells will be securely maintained in position for free swinging movement.

Figure 2:
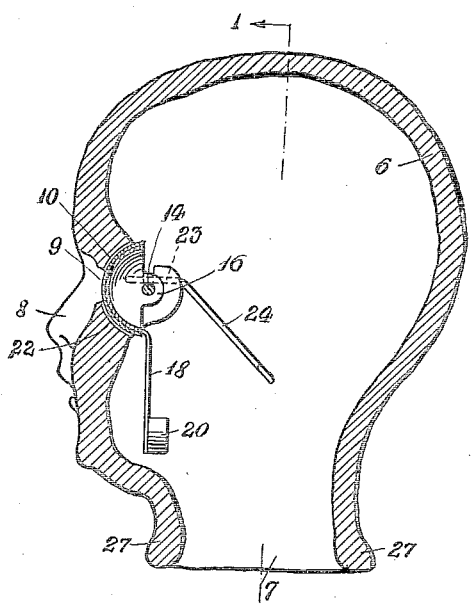
Fig. 2 is a similar view, taken on the line 2—2 of Fig. 1.
Figure 3:
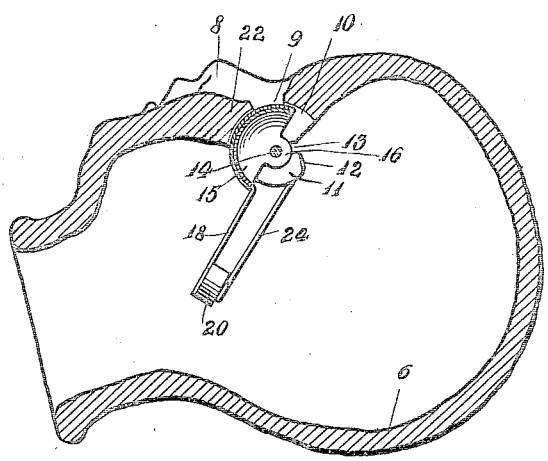
Fig. 3 is a view similar to that of Fig. 2 but showing the relative position of the parts when the head is tilted into horizontal position.
Figure 4:
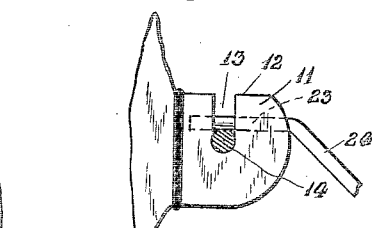
Fig. 4 is an enlarged fragmental view in side elevation, showing the bracket or bridge and how the parts are supported thereby.

Depending from each eye-shell is an arm 18, carrying a weight 20, the arrangement of the same being such that when the head is in upright position as shown in Figs. 1 and 2, the iris regions, indicated at 21, will be visualized centrally of the openings 9. On the other hand, when the head is tilted into or approximately into, horizontal position, the iris regions 21 will be concealed behind the cheek walls 22, as shown in Fig. 3, so that the eyes will appear to be closed. This operation, obviously, is accomplished through the swinging rearwardly of the eye-shells 15 under the falling movement of the weighted arms 18.

As will be understood from an inspection of Fig. 1, the shaft 14 is held in position against longitudinal displacement by means of its angular ends 17, taken in conjunction with the ears 16, the two inner ones of which abut against opposite sides of the bracket 11, while it is held against lateral displacement through the slot 13, by means of the horizontal extremity 23 of the wire element 24, the said extremity being secured in a suitable opening provided longitudinally in the said bracket 11, immediately above and crossing the shaft 14. This wire element 24, behind the bracket 11, extends downwardly and inwardly at an obtuse angle and is then bent upon itself to provide a horizontal portion 25, which extends far enough to lie in the path of an adjacent weight 20, where it is again bent upon itself to provide a portion 26, which extends in the opposite direction far enough to lie in the path of the other weight. Formed in this manner, the wire element not only serves to hold the shaft 14 in its position, but also serves as a rigid stop upon which the weights may fall when the head is tilted into horizontal position as shown in Fig. 3, this whole arrangement being such as to limit the movement of the eye-shells as soon as the same turn into position whereat the iris portions are concealed behind the cheek walls 22.

The structure consisting of the shaft 14, the eye-shells 15 and their attached weighted arms 18, is entered as an entity through the neck opening 7, the shaft 14 being tilted or inclined sufficiently to clear the contracted portion 27; whereupon the shaft is lifted above the bracket 11 and dropped into the slot 13, care here being taken to enter the eye-shells in their sockets. In practice, this is accomplished in one operation and by means of a special tool which grips the shaft 14 between the adjacent ears of the eye-shells. The wire 24 is then installed as a separate operation, the horizontal extremity 23 thereof being first dipped into glue or other adhesive capable of sealing it in its opening in the bracket 11.

Figure 5:
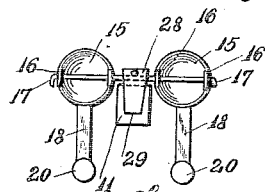
Fig. 5 is a rear elevational view, showing a modified method of supporting the parts upon the bracket or bridge.

In the modification shown in Fig. 5, there is fitted upon the shaft 14, between the eye-shells, a wedge shaped element 28, which, in installation, is set in an opening 29 provided longitudinally in the bracket 11, this wedge shaped member being provided with a suitable opening for the reception of the horizontal extremity 23, just above the said shaft as before. Before inserting this form, the wedge-shaped element is suitably coated with glue or other adhesive, by which it is secured rigidly in its seat in the bracket 11.

Having thus described my invention, what I claim is:—

1. A structure for dolls' eyes comprising, in combination, a bracket on the inside of the head between the eye sockets, a shaft supported intermediate its length on said bracket, a pair of eye-shells swingable on said shaft, the latter having its extremities angled to hold the shells one on each side of said bracket, weighted arms attached to the shells for turning the same on the shaft, and rigid means formed to hold the shaft in position and adapted to serve as a stop for said arms to limit the movement thereof in one direction.

2. A doll head having eye sockets and provided with an interior bracket between the same, said bracket having a transverse slot cut from its upper edge, a shaft seated in said slot, eye shells swung on said shaft and movable in said sockets, weighted arms attached to said eye shells, a wire having a portion engaged in said bracket across the slot therein to hold the shaft in position and having a portion bent downwardly and inwardly and then transversely upon itself to act as a stop for the said arms, as and for the purpose specified.

3. A structure for dolls' eyes comprising, in combination, a pair of semi-spherical eye shells each formed with a pair of axial ears on its circumferential edge, said ears having transverse apertures therethrough, a shaft passing through said apertures and having its extremities angled to hold the shells thereon, weight controlled means for turning the shells on the shaft, means on which to mount the shaft between the adjacent ears of the shells so as to support the shaft and hold it against longitudinal movement, and means for holding the shaft against lateral movement, said last means being formed to serve as a stop to limit the movement of the weight controlled means in one direction.

In testimony whereof I have signed my name to this specification.

ALEXANDER DENES.